US009987990B1

(12) United States Patent
Tacey et al.

(10) Patent No.: US 9,987,990 B1
(45) Date of Patent: Jun. 5, 2018

(54) VEHICLE REAR CARGO AREA STRUCTURE

(71) Applicant: Nissan North America, Inc., Franklin, TN (US)

(72) Inventors: Adam David Tacey, Wixom, MI (US); Ananda Bennur Umamaheshwara, Karnataka (IN); Nachiket Chandrakant Gohokar, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days. days.

(21) Appl. No.: 15/365,785

(22) Filed: Nov. 30, 2016

(51) Int. Cl.
*B60R 5/04* (2006.01)
*B62D 25/08* (2006.01)

(52) U.S. Cl.
CPC .............. *B60R 5/045* (2013.01); *B60R 5/04* (2013.01); *B60R 5/047* (2013.01); *B62D 25/087* (2013.01)

(58) Field of Classification Search
CPC .......... B60R 5/047; B60R 5/045; B60R 5/048
USPC ...................................... 296/24.43
See application file for complete search history.

(56) References Cited

U.S. PATENT DOCUMENTS

| | | | |
|---|---|---|---|
| 8,844,995 B2 | 9/2014 | Nagao et al. | |
| 9,340,143 B2 | 5/2016 | Stakoe et al. | |
| 2008/0277957 A1 | 11/2008 | Hirayama et al. | |
| 2009/0174225 A1 * | 7/2009 | Day | B60R 5/047 296/193.08 |
| 2017/0144607 A1 * | 5/2017 | Utsunomiya | B60R 5/048 |

FOREIGN PATENT DOCUMENTS

| | | | | |
|---|---|---|---|---|
| DE | 10223685 A1 * | 4/2004 | ............ | B60R 5/045 |
| EP | 0061928 A1 * | 10/1982 | ............ | B60R 5/045 |
| JP | 60-31946 Y2 | 9/1985 | | |
| JP | 11-048870 A | 2/1999 | | |
| JP | 3889558 B2 | 3/2007 | | |

* cited by examiner

*Primary Examiner* — Jason S Morrow

(57) ABSTRACT

A vehicle body structure defines a cargo area. With a rear door in a closed orientation the rear door blocks access to the cargo area. In an open orientation, the rear door exposes the cargo area. A first cover is supported within the vehicle body structure above and spaced apart from a floor proximate a forward end of the cargo area. The first cover is movable between a retracted orientation exposing the cargo area and an extended orientation at least partially concealing the cargo area. A second cover is attached to the rear door along an interior surface thereof such that with the rear door in the closed orientation and the first cover in the extended orientation, the first cover abuts the second cover such that the first cover and the second cover conceal the cargo area.

15 Claims, 9 Drawing Sheets

VEHICLE REAR CARGO AREA STRUCTURE

BACKGROUND

Field of the Invention

The present invention generally relates to a vehicle rear cargo area structure. More specifically, the present invention relates to cover structure having a first cover and a second cover that cooperate to completely cover a cargo area within the vehicle rear cargo area structure.

Background Information

Vehicles such as SUVs and station wagons, usually include a rear cargo area that is visible through windows of the vehicle.

SUMMARY

On object of the present disclosure is to provide a vehicle body structure that defines a rear cargo area with a two-part cargo cover structure that completely conceals the rear cargo area.

In view of the state of the known technology, one aspect of the present disclosure is to provide a vehicle rear cargo area structure with a vehicle body structure, a rear door, a first cover and a second cover. The vehicle body structure has a first side wall, a second side wall and a floor, with a rear opening being defined between rearward portions of the first side wall and the second side wall. Further, a cargo area is defined between the first side wall and the second side wall. The rear door is supported to the vehicle body structure for movement between a closed orientation and an open orientation. With the rear door in the closed orientation, the rear door blocks access to the cargo area via the rear opening and in the open orientation the rear door is moved away from the rear opening exposing the cargo area. The first cover is supported within the vehicle body structure between the first side wall and the second side wall above and spaced apart from the floor proximate a forward end of the cargo area. The first cover is movable between a retracted orientation exposing the cargo area and an extended orientation at least partially concealing the cargo area. The second cover is attached to the rear door along an interior surface thereof such that with the rear door in the closed orientation and the first cover in the extended orientation, the first cover abuts the second cover such that the first cover and the second cover conceal the cargo area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
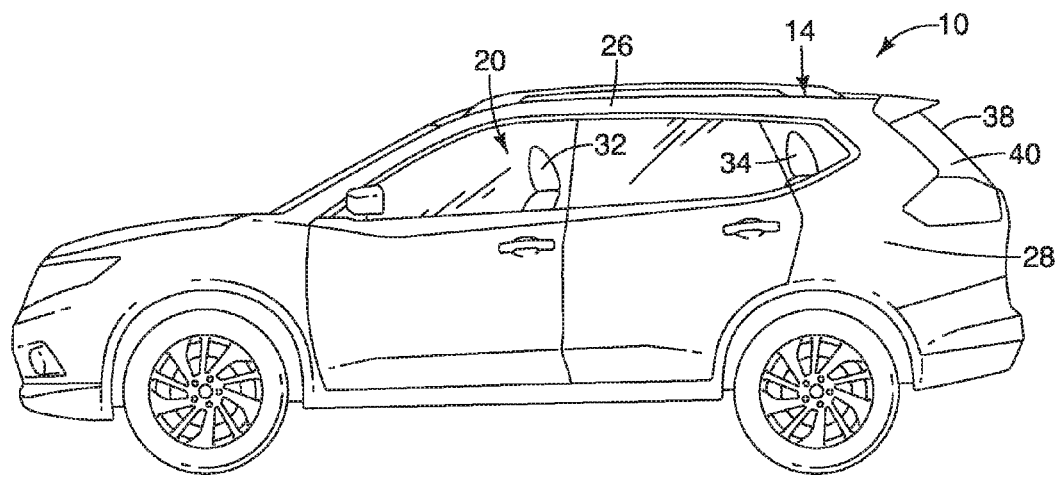
FIG. 1 is side view of a vehicle that includes a rear cargo area in accordance with a first embodiment.

Referring initially to FIG. 1, a vehicle 10 is illustrated in accordance with a first embodiment. The vehicle 10 includes a cargo cover structure 12 (shown in FIGS. 4 and 5), as described in greater detail below after a description of the vehicle 10.

Figure 2:
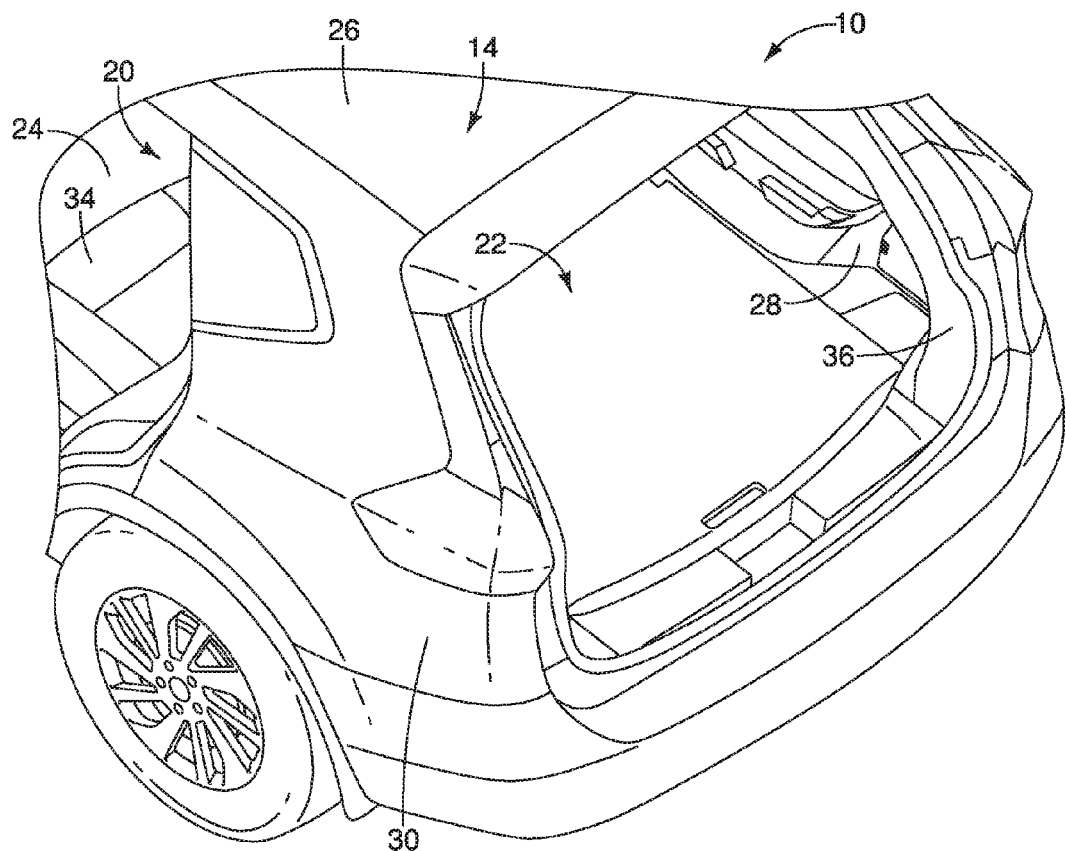
FIG. 2 is a perspective view of the vehicle showing a portion of the rear cargo area in accordance with the first embodiment.

As shown in FIGS. 1 and 2, the vehicle 10 basically includes a vehicle body structure 14 that defines a passenger compartment 20 and a cargo area 22. The passenger compartment 20 is partially defined by a floor 24, a roof 26, a first side wall 28 and a second side wall 30. Front seats 32 and rear seats 34 are installed to the floor 24 within the passenger compartment 20. The cargo area 22 is defined between the first side wall 28 and the second side wall 30 rearward of the rear seats 34. A rear opening 36 is defined between rearward portions of the first side wall 28 and the second side wall 30. The cargo area 22 is accessed via the rear opening 36.

Figure 3:
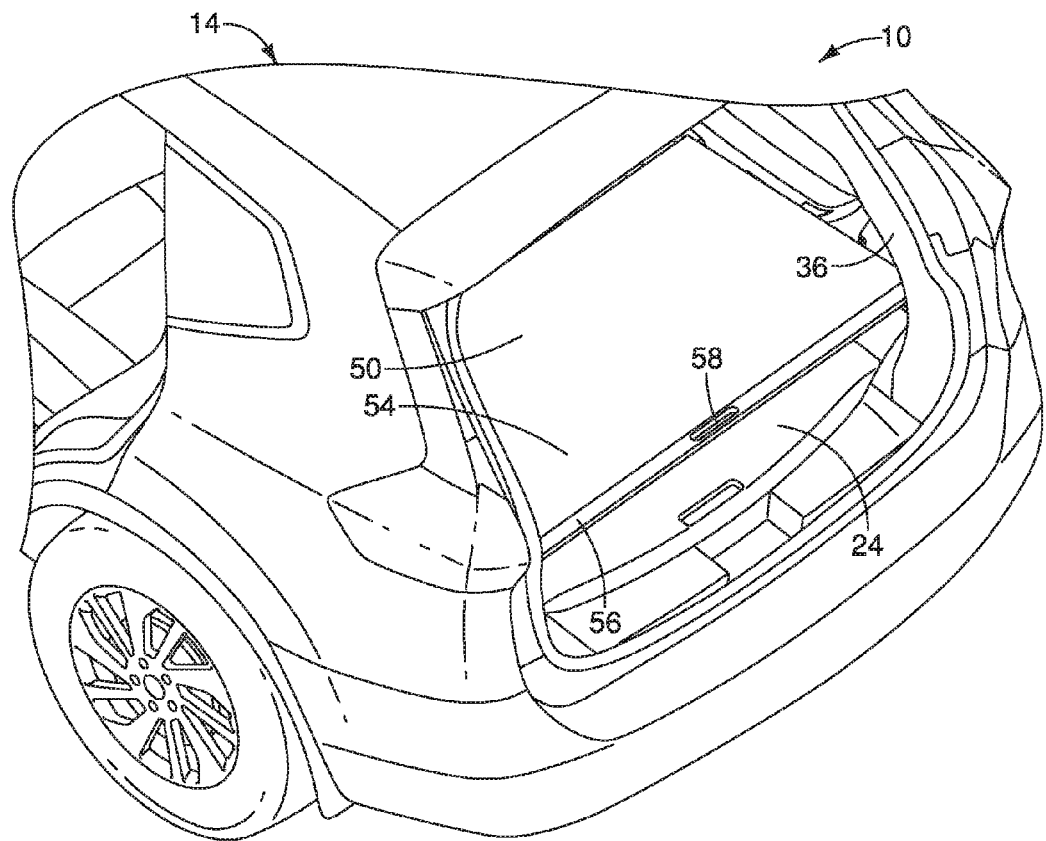
FIG. 3 is another perspective view of the vehicle showing the portion of the rear cargo area partially concealed by a retractable cover portion (a first cover) in accordance with the first embodiment.
Figure 5:
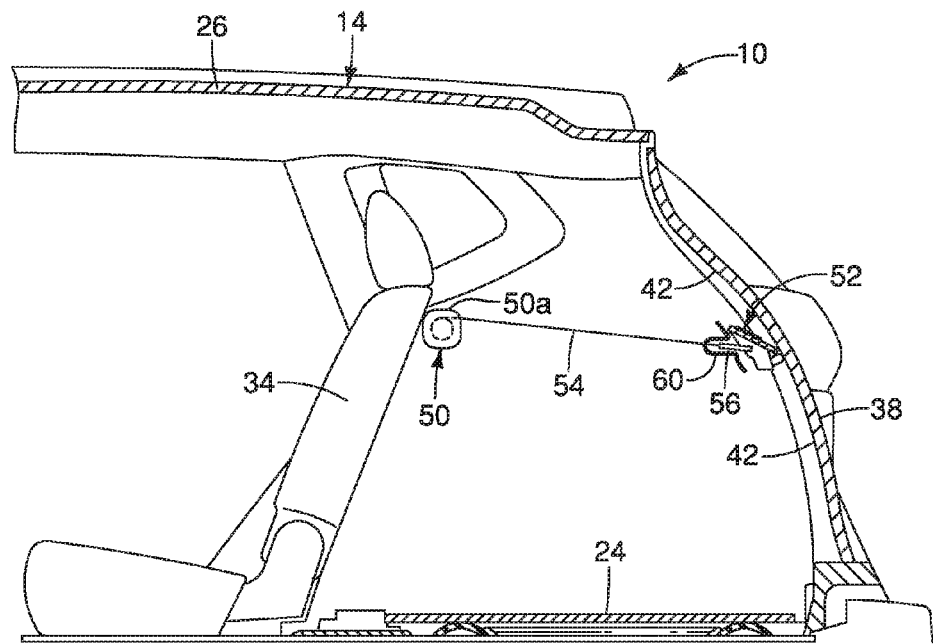
FIG. 5 is another side cross-sectional view of the rear portion of the vehicle similar to FIG. 4, showing the cargo area, the rear door in the closed position, the first cover and the fixed cover, with the first cover in an extended orientation such that the first and second covers completely conceal the cargo area in accordance with the first embodiment.
Figure 6:
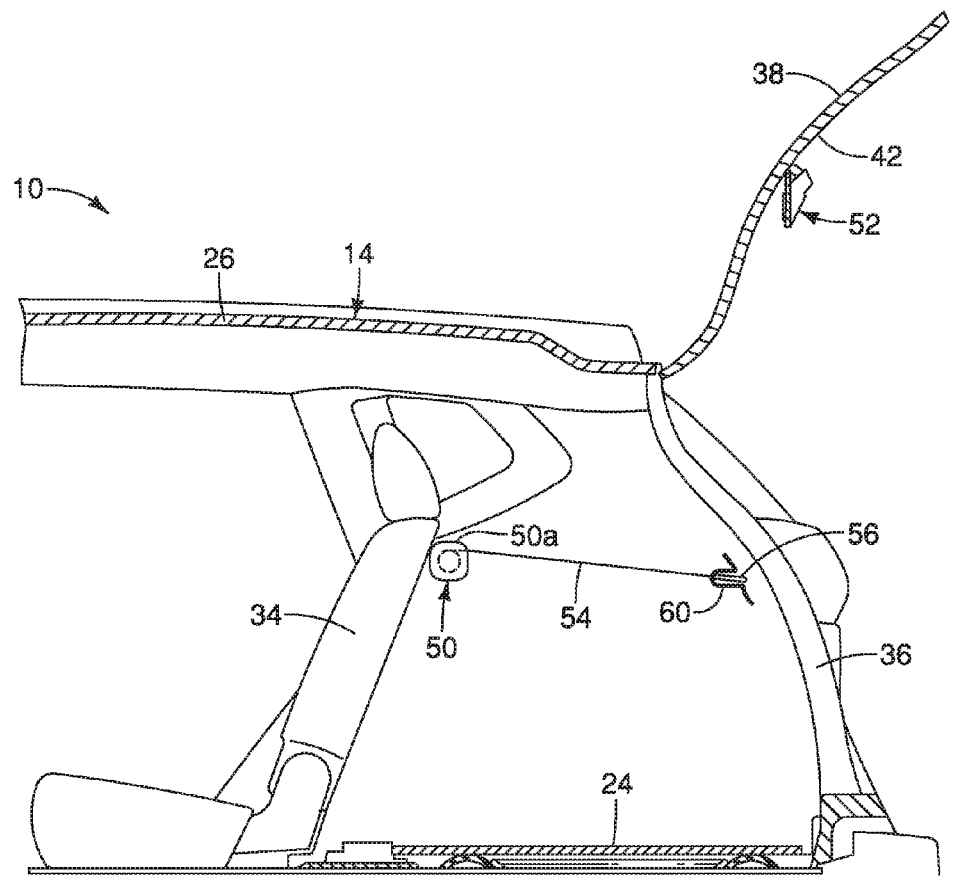
FIG. 6 is another side cross-sectional view of the rear portion of the vehicle similar to FIGS. 4 and 5, showing the cargo area, the rear door in an open position, the first cover and the fixed cover, with the first cover in an extended orientation in accordance with the first embodiment.
Figure 7:
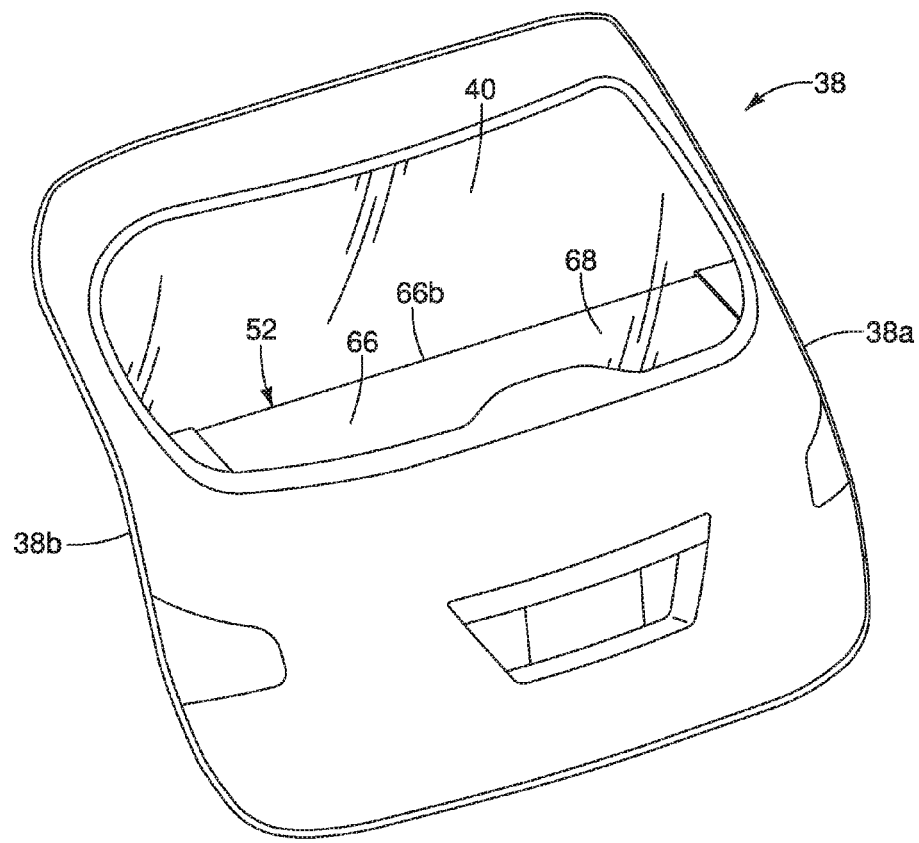
FIG. 7 is a perspective view of the rear door shown removed from the vehicle showing an outer surface of the rear door and the second cover visible through a rear window of the rear door in accordance with the first embodiment.

A rear door 38 is installed to the vehicle body structure 14 for movement between a closed orientation (FIGS. 1, 4 and 5) and an open orientation (FIGS. 2, 3 and 6). With the rear door 38 in the closed orientation the rear door 38 blocks access to the cargo area 22 via the rear opening 36. In the open orientation, the rear door 38 is moved away from the rear opening 36 exposing the cargo area 22. The rear door 38 is supported to the vehicle body structure 12 via conventional hinges (not shown) that are attached to an upper end of the rear door 38. The rear door 38 includes a rear window 40 and an interior surface 42. As shown in FIGS. 4-6 and 12, the interior surface 42 of the rear door 38 has a concaved curved contour.

In the depicted embodiments, the vehicle 10 is a sports utility vehicle (SUV). However, the vehicle 10 can be any vehicle that includes a rear door that opens to provide access to a cargo area. Further, the cargo cover structure 12 (described further below) can be used in any vehicle where a vehicle operator desires a cover to cover a cargo area and thereby conceal the contents of the cargo area.

Figure 4:
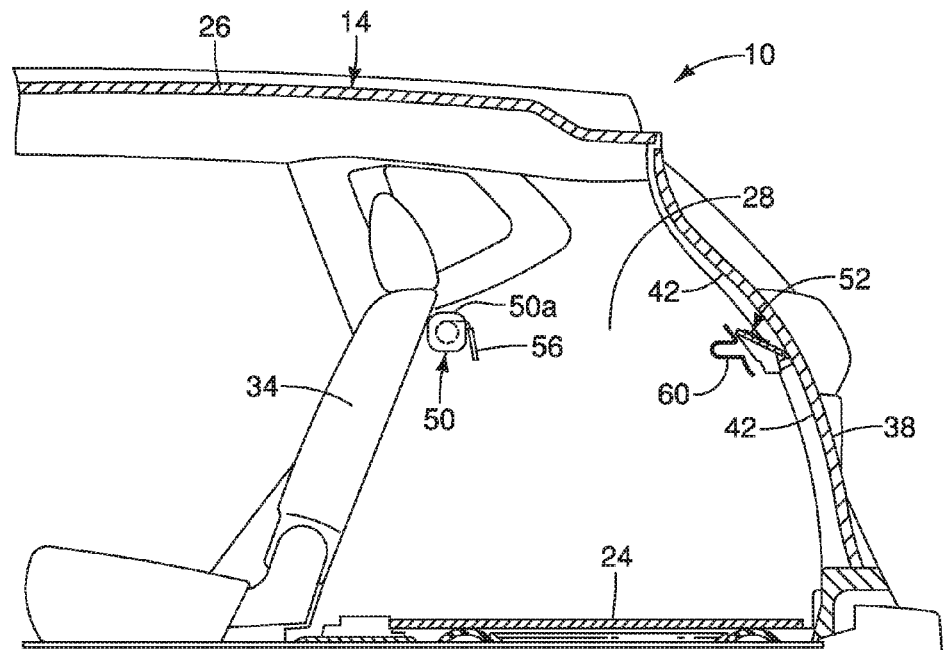
FIG. 4 is a side cross-sectional view of a rear portion of the vehicle depicted in FIGS. 1-3 showing the cargo area, a rear door in a closed position, the first cover and a fixed cover (a second cover) fixed to an interior surface of the rear door, with the first cover in a retracted orientation in accordance with the first embodiment.

As shown in FIGS. 4-6, the cargo area 22 is located behind the rear seats 34 and between the first side wall 28 and the second side wall 30. In the depicted embodiment, the floor 24 within the cargo area 22 is defined by a removable panel that conceals a spare tire (not shown). Alternatively, the floor 24 within the cargo area 22 can be defined by a metallic panel constructed as part of the vehicle body structure 14, where the spare tire (not shown) is stored under the vehicle body structure 14. The floor 24 of cargo area 22 lies substantially along a first plane $P_1$.

A description of the cargo cover structure 12 is now provided with specific reference to FIGS. 3-14. The cargo cover structure 12 includes a retractable cover portion 50 (also referred to as a first cover) and a fixed cover portion 52 (also referred to as a second cover).

The first cover 50 includes a housing 50a, an inner retraction mechanism (not shown) and a flexible cover 54. The flexible cover 54 is configured to wrap around the retraction mechanism within the housing 50a in the retracted orientation (FIG. 4). The flexible cover 54 of the first cover 50 is movable between a retracted orientation (FIG. 4) in which the cargo area 22 is exposed and an extended orientation (FIGS. 5 and 6) at least partially concealing the cargo area 22. The retraction mechanism of the first cover 50 includes a spring-loaded spindle that receives the flexible cover 54 as it is rolled up within the housing 50a when retracted.

The housing 50a of the first cover 50 is supported within the vehicle body structure 14 between the first side wall 28 and the second side wall 30 at locations above and spaced apart from the floor 24 and proximate a forward end of the cargo area 22, as shown in FIGS. 4-6. Specifically, the first cover 50 is releasably secured within the cargo area 22 within respective recesses (not shown) that are formed in the first and second side walls 28 and 30. Hence, the first cover 50 can be removed from the cargo area 22, if desired. Recesses in side walls of a cargo area of a cargo area for removable retention of a retractable cargo area cover are conventional features of a vehicle. Therefore, further description of the retention of the first cover 50 within the cargo area 22 is omitted for the sake of brevity.

The flexible cover 54 includes a rigid end portion 56 that defines a grip opening 58 (FIG. 3). When the flexible cover 54 is in the extended orientation (FIGS. 5 and 6), opposite ends of the rigid end portion 56 are inserted into recesses 60 (only one recess 60 is shown in FIGS. 4, 5 and 6) formed in the first side wall 28 and the second side wall 30.

As shown in FIGS. 7-13, the second cover 52 is fixedly attached to the rear door 38 along the interior surface 42 below the rear window 40. With the rear door 38 in the closed position (FIG. 5) and the first cover 50 in the extended orientation, the first cover 50 abuts the second cover 52 such that the first cover 50 and the second cover 52 conceal the cargo area 22. In the first embodiment, the first cover 50 abuts the second cover 52 below an upper edge of the second cover 52 such that the grip opening 58 of the rigid end portion 56 of the flexible cover 54 is covered and concealed.

Figure 13:
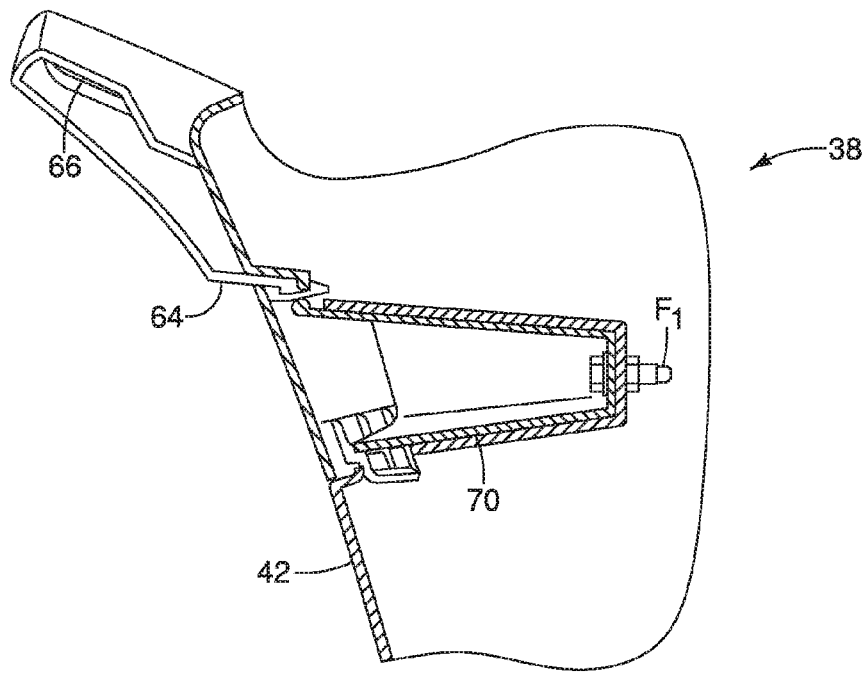
FIG. 13 is a cross-sectional view of a portion of the rear door showing the attachment portion of the second cover attached to the rear door in accordance with the first embodiment.

The second cover 52 includes attachment structures 64 and a rigid elongated member 66. The attachment structures 64 are located at opposite lateral ends of the rigid elongated member 66. As shown in FIG. 13, the attachment structure 64 are fixed to a fastening surface 70 of the rear door 38 via mechanical fasteners $F_1$ (only one attachment structure 64 and one fastener are shown in FIG. 13). The attachment structures 64 are fixed to and support the lateral ends of the rigid elongated member 66. The attachment structure 64 can be attached to the rigid elongated member 66 by, for example, adhesive materials or mechanical fasteners (not shown).

Figure 14:
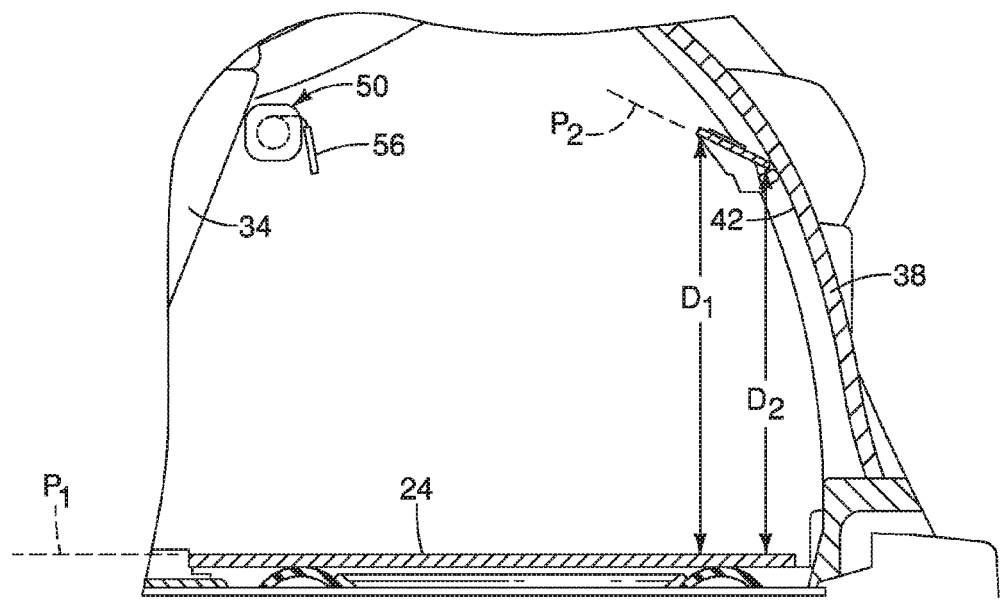
FIG. 14 is a cross-sectional view of the cargo area and the rear door showing details of the orientation of the second cover in accordance with the first embodiment.

The rigid elongated member 66 is a flat panel that has a crescent moon or curved shape and also has a generally planar upper surface 68. The planar upper surface 68 defines a second plane $P_2$. The rigid elongated member 66 of the second cover 52 has a rearward edge 66a (a lower edge) and a forward edge 66b (the upper edge of the second cover 52). As shown in FIG. 14, with the rear door 38 in the closed orientation, the forward edge 66b of the second cover 52 is a first distance $D_1$ above the floor 24 of the vehicle body structure 14. The rearward edge 66a of the second cover 52 is a second distance $D_2$ above the floor 24. As shown in FIG. 14, the first distance $D_1$ is greater than the second distance $D_2$. Hence, the elongated member 66 is inclined and is not necessarily horizontally oriented. Further, the second plane $P_2$ defined by the upper surface 68 of the elongated member 66 is angularly offset from the first plane $P_1$ defined by the floor 24 of cargo area 22. In other words, the first plane $P_1$ and the second plane $P_2$ are not parallel.

Figure 8:
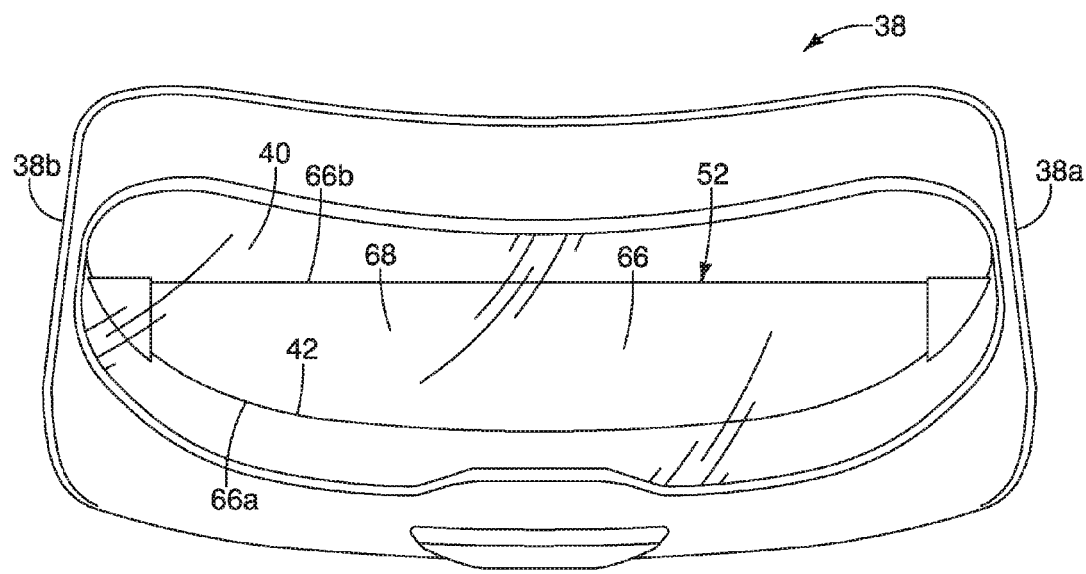
FIG. 8 is a top view of the rear door shown removed from the vehicle showing the outer surface of the rear door and the second cover visible through the rear window of the rear door in accordance with the first embodiment.
Figure 9:
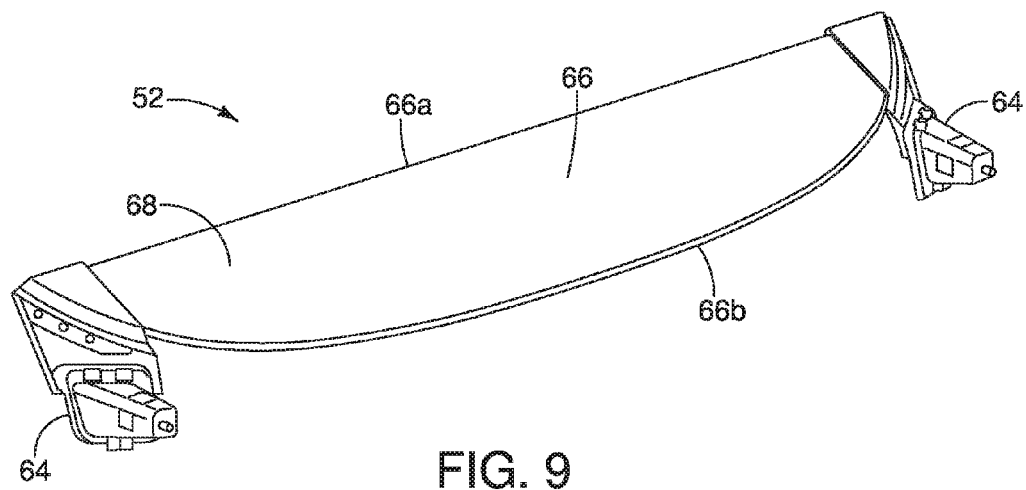
FIG. 9 is a perspective view of the second cover shown removed from the rear door in accordance with the first embodiment.
Figure 10:
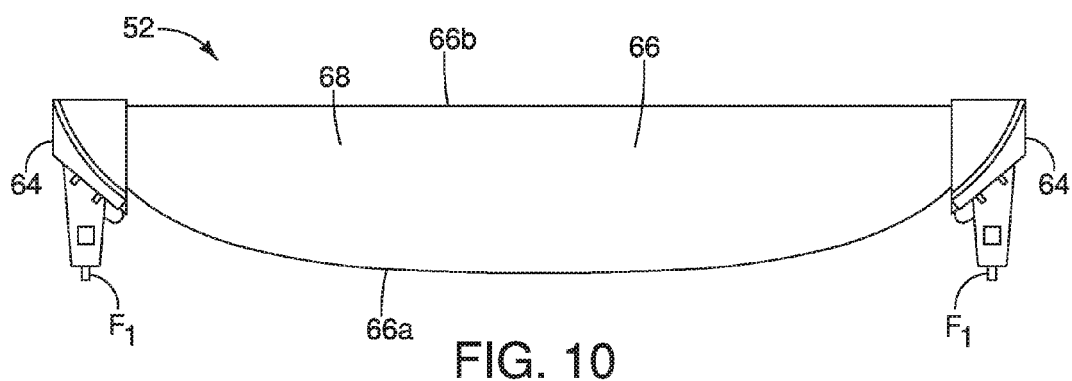
FIG. 10 is a top view of the second cover shown removed from the rear door in accordance with the first embodiment.
Figure 11:
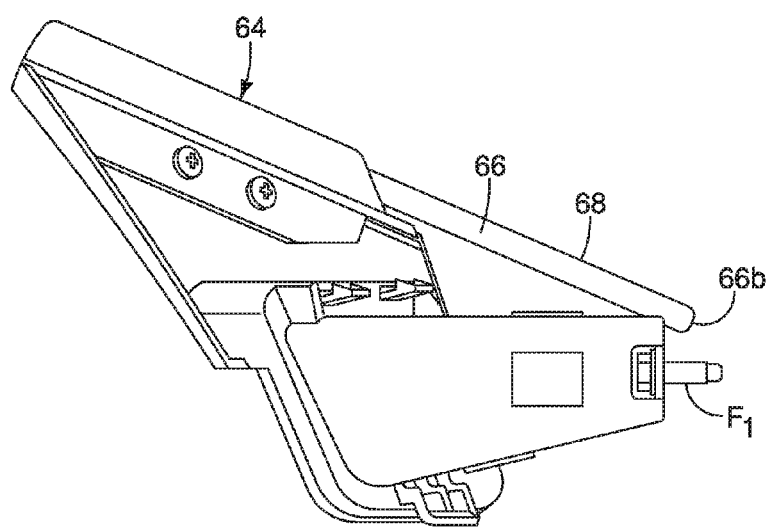
FIG. 11 is a side view of the second cover shown removed from the rear door showing attachment portion of the second cover in accordance with the first embodiment.
Figure 12:
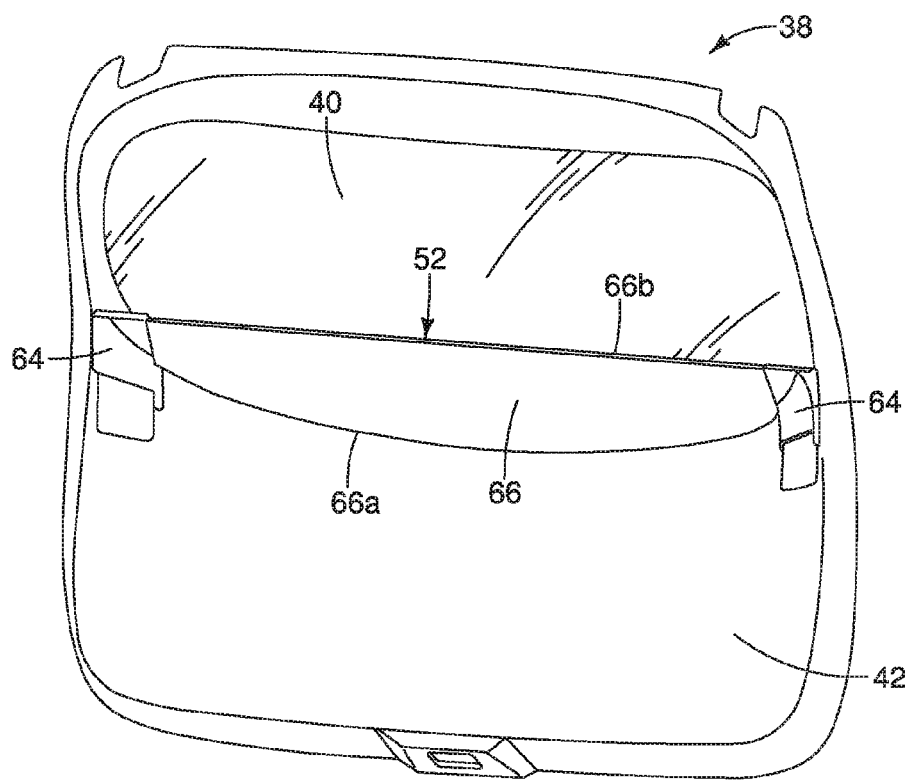
FIG. 12 is a perspective view of the rear door shown removed from the vehicle showing an interior surface of the rear door showing the second cover attached thereto in accordance with the first embodiment.

The rearward edge 66a of the second cover 52 extends along the interior surface 42 of the rear door 38 below the rear window 40 from proximate a first lateral side 38a of the rear door 38 to proximate a second lateral side 38b of the rear door 38. As shown in FIGS. 8-10 and 12, the rearward edge 66a of the second cover 52 has an overall convex shape (a crescent shape). As shown in FIGS. 8 and 12, the interior surface 42 of the rear door 38 has a corresponding concave shape. Hence, the rearward edge 66*a* of the second cover 52 conforms to and mates with the interior surface 42 of the rear door 38.

In the first embodiment, since the foreword edge 66*b* of the second cover 52 extends foreword and above the rigid end portion 56 of the flexible cover 54 of the first cover 50, the rigid elongated member 66 of the second cover 52 covers the grip opening 58 of the first cover 50. Consequently, any cargo in the cargo area 22 is completely concealed by the cargo cover structure 12 from anyone looking through the windows of the vehicle 10.

Second Embodiment

Figure 15:
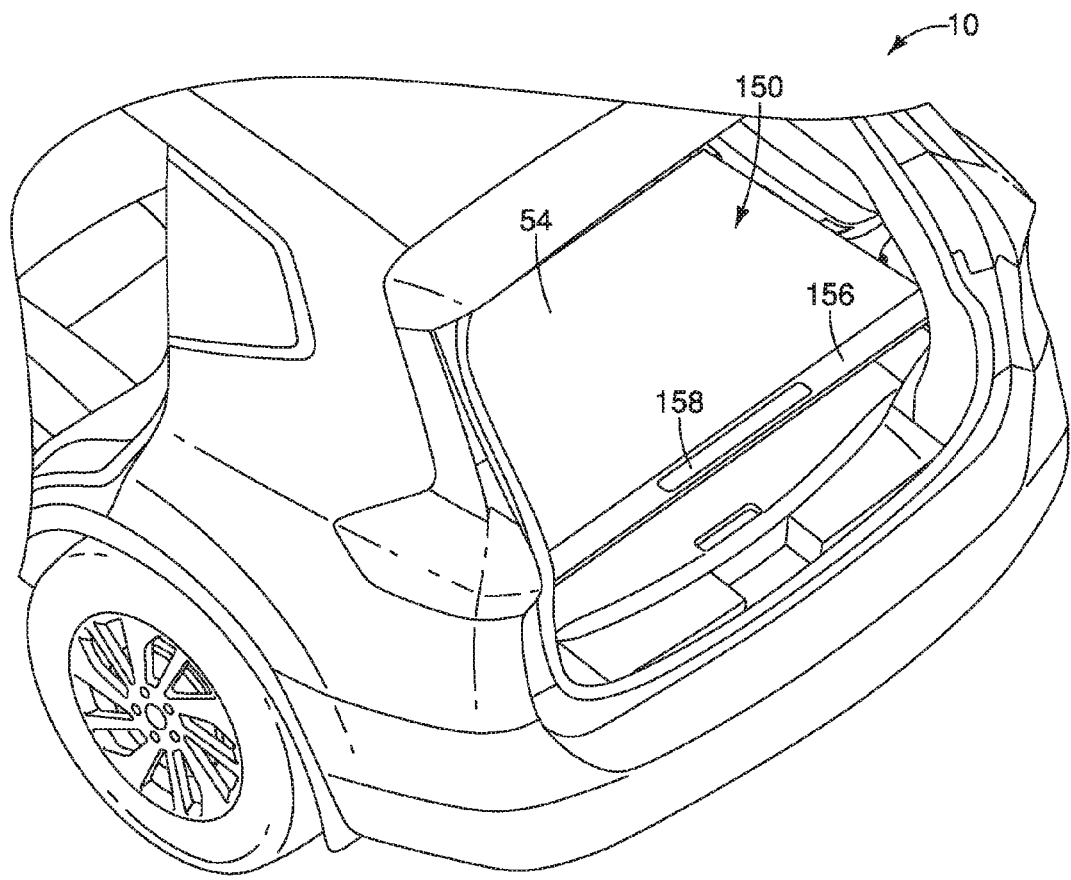
FIG. 15 is a perspective view of the vehicle showing a portion of the rear cargo area and a first cover in accordance with a second embodiment.
Figure 16:
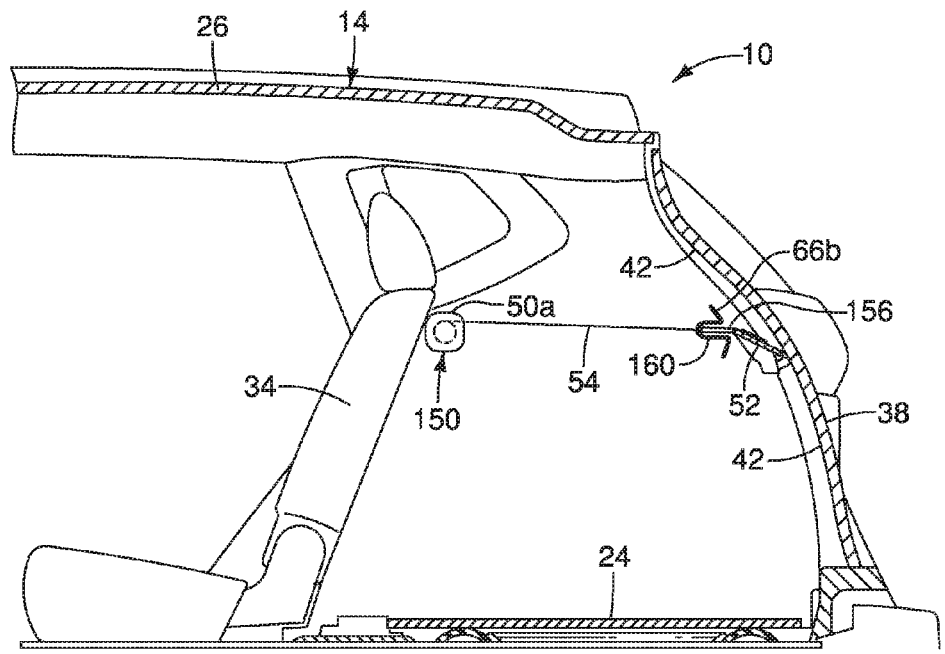
FIG. 16 is side cross-sectional view of the vehicle showing a portion of the rear cargo area that includes a retractable cover portion (a first cover) in accordance with the second embodiment.

Referring now to FIGS. 15 and 16, a cargo cover structure 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the cargo cover structure 112 includes all of the vehicle 10 related structures described with respect to the first embodiment, except that recesses 160 in the first and second side walls 28 and 30 are located slightly higher than the recesses 60 described above with respect to the first embodiment.

The cargo cover structure 112 includes a first cover 150 that includes the housing 50*a* and the flexible cover 54 of the first cover 50 described above with respect to the first embodiment. However, in the second embodiment, the rigid end portion 56 of the flexible cover 54 of the first embodiment has been replaced with a rigid end portion 156. The rigid end portion 156 does not include a grip opening such as the grip opening 58 in the first embodiment. Instead the rigid end portion 156 is provided with a recessed area 158 that can be gripped by a person wishing to move the first cover 150.

The effects of the modifications presented in the second embodiment are that the first cover 150 and the second cover 52 are configured such that with the rear door 38 in the closed orientation and the first cover 150 in the extended orientation, the first cover 150 abuts the forward edge 66*b* of the second cover 52. Since there is no grip opening in the rigid end portion 156, it is not necessary for the second cover 52 to extend over the rigid end portion 156 of the first cover 150.

Third Embodiment

Figure 17:
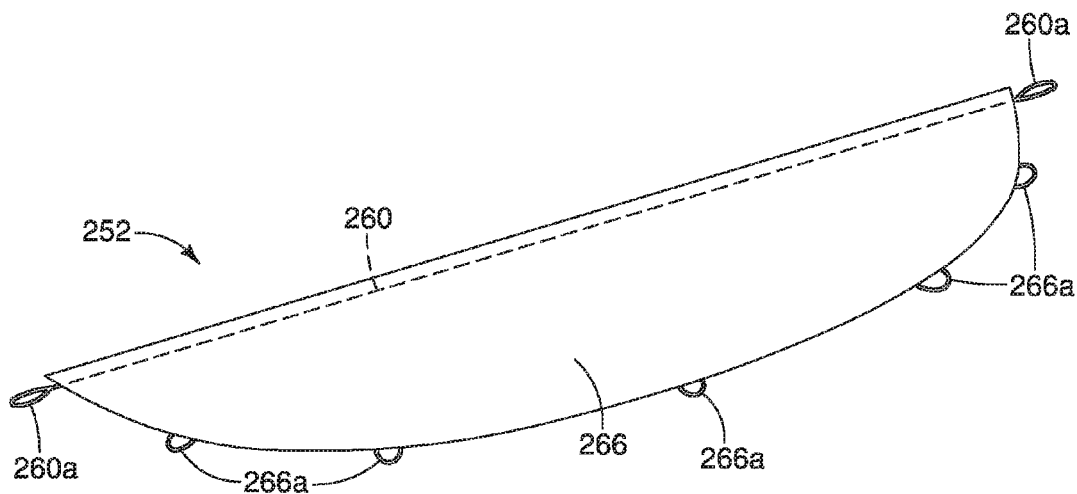
FIG. 17 is a perspective view of a second cover in accordance with a third embodiment.
Figure 18:
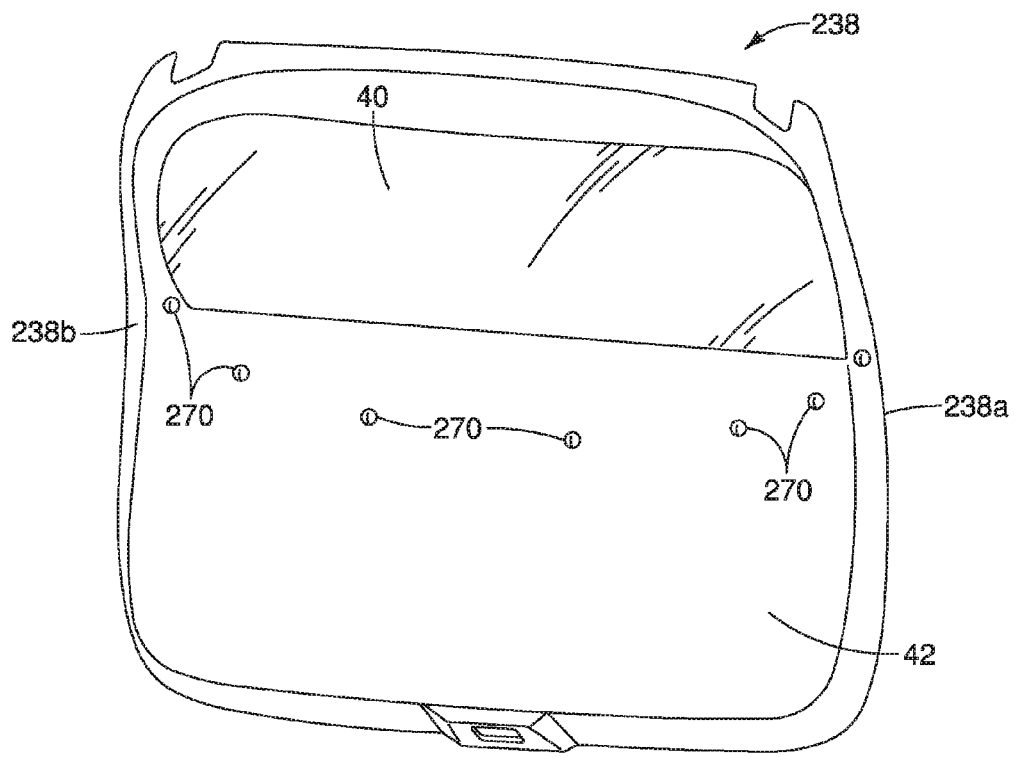
FIG. 18 is a perspective view of an interior surface of a rear door without the second cover in accordance with the third embodiment.
Figure 19:
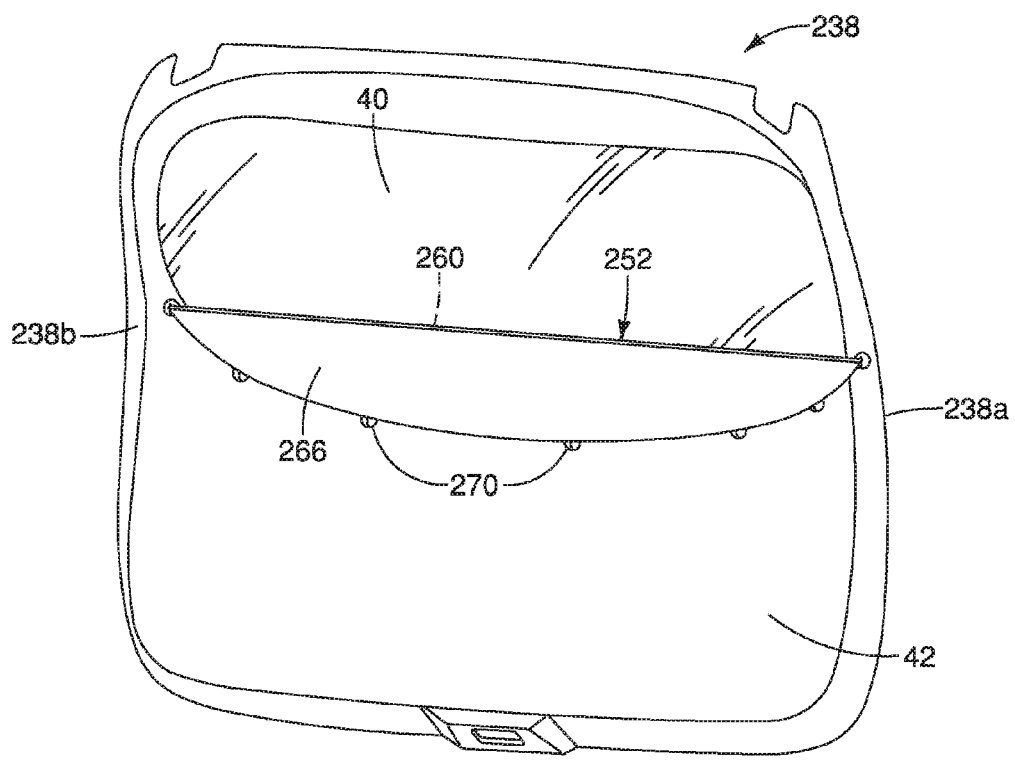
FIG. 19 is another perspective view of the interior surface of the rear door with the second cover installed in accordance with the third embodiment.

Referring now to FIGS. 17-19, a second cover 252 (a fixed cover portion) in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the first cover 50 (not shown) is exactly as described above with respect to the first embodiment and is therefore not described again hereinbelow for the sake of brevity.

In the third embodiment, all modifications as compared to the first embodiment are made to the rear door 38 and the second cover 52. Specifically, in the third embodiment, the rear door 38 of the first embodiment is replace with a rear door 238 (FIGS. 18 and 19) and the second cover 52 of the first embodiment is replaced with a second cover 252 (FIGS. 17 and 19).

As shown in FIGS. 18 and 19, the rear door 238 includes the rear window 40 and the interior surface 42 as described above with respect to the first embodiment, but does not include the fastening structure 70. Instead, the rear door 238 includes a plurality fastening hooks 270 on the interior surface 42 thereof, s shown in FIG. 18.

As shown in FIGS. 17 and 19, the second cover 252 has an overall crescent shape and is made of flexible materials. Specifically, the second cover 252 includes an elongated elastic member 260 and a flexible sheet-like portion 266. The elongated elastic member 260 is rope-like, but is flexible, elastic and resilient. Specifically, the elongated elastic member 260 can be stretched such that its overall length can change, but is elastic such that it returns to its original length after being stretched or deformed. The flexible sheet-like portion 266 is fixedly attached to the elongated elastic member 260 and is also flexible, elastic and resilient. The flexible sheet-like portion 266 has a rear edge that extends along the interior surface 42 of the rear door 238 from proximate a first lateral side 238*a* of the rear door 238 to proximate a second lateral side 238*b* of the rear door 238.

The elongated elastic member 260 includes loops 260*a* formed at opposite ends thereof. Further, the rear edge of the flexible sheet-like portion 266 includes a plurality of loops 266*a*. The loops 260*a* and 266*a* are positioned to correspond to the plurality of fastening hooks 270 on the interior surface 42 of the rear door 238. As shown in FIG. 19, the loops 260*a* and 266*a* are installed to the fastening hooks 270 retaining the second cover 252 to the rear door 238. The second cover 252 can easily be removed from the rear door 238 by taking the loops 260*a* and 266*a* off the hooks 270. When the second cover 252 is installed to the rear door 238, the elongated elastic member 260 defines or extends along a forward end of the second cover 252.

The second cover 252 is dimensioned and positioned on the rear door 238 such that it can be used the first cover 50 of the first embodiment and the first cover 150 of the second embodiment.

The various portions of the vehicle 10 other than the cargo covers structures described above, are conventional components that are well known in the art. Since these other portions of the vehicle 10 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the cargo cover structure. Accordingly, these terms, as utilized to describe the present invention should be interpreted relative to a vehicle equipped with the cargo cover structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle rear cargo area structure, comprising:
a vehicle body structure having a first side wall, a second side wall and a floor, with a rear opening being defined between rearward portions of the first side wall and the second side wall, a cargo area being defined between the first side wall and the second side wall, and the floor defining a first plane;
a rear door supported to the vehicle body structure for movement between a closed orientation and an open orientation, such that with the rear door in the closed orientation the rear door blocks access to the cargo area via the rear opening and in the open orientation the rear door is moved away from the rear opening exposing the cargo area, the rear door having a rear window and an interior surface that has a concaved curved contour with a first lateral side and second lateral side of the rear door extending forward of a central area of the interior surface of the rear door proximate a lower edge of the window with the rear door in the closed orientation;
a first cover supported within the vehicle body structure between the first side wall and the second side wall above and spaced apart from the floor proximate a forward end of the cargo area, the first cover being movable between a retracted orientation exposing the cargo area and an extended orientation at least partially concealing the cargo area, such that with the first cover in the extended orientation the first cover has an upper planar surface; and
a second cover attached to the rear door along the interior surface below the window, the second cover having a planar upper surface defining a second plane such that with the door in the closed orientation the first plane and the second plane are non-parallel, the second cover defining a forward edge that is located rearward of the first and second lateral sides of the rear door with the rear door in the closed orientation, and with the rear door in the closed orientation and the first cover in the extended orientation a rearward edge of the first cover and the forward edge of the second cover abut one another such that the first cover and the second cover conceal the cargo area, and the second plane and the upper planar surface of the front cover intersect one another along the forward edge of the second cover.

2. The vehicle rear cargo area structure according to claim 1, wherein
the second cover extends along the interior surface of the rear door below the rear window from proximate the first lateral side of the rear door to proximate the second lateral side of the rear door.

3. The vehicle rear cargo area structure according to claim 1, wherein
the second cover has a rearward edge, and with the rear door in the closed orientation the forward edge is a first distance above the floor of the vehicle body structure and the rearward edge is a second distance above the floor of the vehicle body structure, the first distance being greater than the second distance.

4. The vehicle rear cargo area structure according to claim 1, wherein
the second cover is a rigid elongated member that extends along the interior surface of the rear door from proximate the first lateral side of the rear door to proximate the second lateral side of the rear door.

5. A vehicle rear cargo area structure comprising:
a vehicle body structure having a first side wall, a second side wall and a floor, with a rear opening being defined between rearward portions of the first side wall and the second side wall, a cargo area being defined between the first side wall and the second side wall;
a rear door supported to the vehicle body structure for movement between a closed orientation and an open orientation, such that with the rear door in the closed orientation the rear door blocks access to the cargo area via the rear opening and in the open orientation the rear door is moved away from the rear opening exposing the cargo area, the rear door having a rear window and an interior surface that has a concaved curved contour with a first lateral side and second lateral side of the rear door extending forward of a central area of the interior surface of the rear door proximate a lower edge of the window with the rear door in the closed orientation;
a first cover supported within the vehicle body structure between the first side wall and the second side wall above and spaced apart from the floor proximate a forward end of the cargo area, the first cover being movable between a retracted orientation exposing the cargo area and an extended orientation at least partially concealing the cargo area; and
a second cover attached to the rear door along the interior surface below the window, the second cover defining a forward edge that is located rearward of the first and second lateral sides of the rear door with the rear door in the closed orientation and with the first cover in the extended orientation a portion of the first cover abuts the second cover such that the first cover and the second cover conceal the cargo area, the second cover being a flexible elongated member having a rear edge that extends along the interior surface of the rear door from proximate a first lateral side of the rear door to proximate a second lateral side of the rear door, the second cover further includes an elongated elastic member that extends along the forward end of the second cover, the second cover having a first lateral end releasably attached the rear door proximate the first lateral side of the rear door and a second end releasably attached the rear door proximate the second lateral side of the rear door.

6. The vehicle rear cargo area structure according to claim 5, wherein
the second cover further includes a flexible sheet-like portion fixedly attached to the elongated elastic member, the flexible sheet-like portion defining the rear edge of the second cover and being releasable attached to the rear door.

7. The vehicle rear cargo area structure according to claim 6, wherein
the elongated elastic member and the flexible sheet-like portion of the second cover both include loops that removably attached to hooks attached to the interior surface of the rear door.

8. The vehicle rear cargo area structure according to claim 1, wherein
the second cover has a rear edge that extends along the interior surface of the rear door.

9. The vehicle rear cargo area structure according to claim 8, wherein
the rear edge of the second cover has an overall convex curved shape that conforms to the concaved curved contour of the interior surface of the rear door.

10. A vehicle rear cargo area structure, comprising:
a vehicle body structure having a first side wall, a second side wall and a floor, with a rear opening being defined between rearward portions of the first side wall and the second side wall, a cargo area being defined between the first side wall and the second side wall;
a rear door supported to the vehicle body structure for movement between a closed orientation and an open orientation, such that with the rear door in the closed orientation the rear door blocks access to the cargo area via the rear opening and in the open orientation the rear door is moved away from the rear opening exposing the cargo area;
a first cover supported within the vehicle body structure between the first side wall and the second side wall above and spaced apart from the floor proximate a forward end of the cargo area, the first cover being movable between a retracted orientation exposing the cargo area and an extended orientation at least partially concealing the cargo area; and
a second cover fixedly and non-movably attached to the rear door along an interior surface thereof, the second cover having a rearward edge and a forward edge, and with the rear door in the closed orientation the forward edge is a first distance above the floor of the vehicle body structure and the rearward edge is a second distance above the floor of the vehicle body structure, the first distance being greater than the second distance, and with the rear door in the closed orientation and the first cover in the extended orientation a portion of the first cover abuts the second cover such that the first cover and the second cover conceal the cargo area.

11. The vehicle rear cargo area structure according to claim 10, wherein
the interior surface of the rear door and a concaved curved contour, and
the second cover has a rear edge that has an overall convex curved shape that conforms to a concaved curved contour of the interior surface of the rear door, the rear edge extending along the interior surface of the rear door.

12. The vehicle rear cargo area structure according to claim 10, wherein
the first cover and the second cover are configured such that with the rear door in the closed orientation and the first cover in the extended orientation the first cover abuts the second cover below a forward edge of the second cover.

13. The vehicle rear cargo area structure according to claim 10, wherein
the first cover and the second cover are configured such that with the rear door in the closed orientation and the first cover in the extended orientation the first cover abuts a forward edge of the second cover.

14. The vehicle rear cargo area structure according to claim 10, wherein
the rear door includes a rear window, and
the second cover extends along the interior surface of the rear door below the rear window from proximate a first lateral side of the rear door to proximate a second lateral side of the rear door.

15. The vehicle rear cargo area structure according to claim 10, wherein
the second cover is a rigid elongated member that extends along the interior surface of the rear door from proximate a first lateral side of the rear door to proximate a second lateral side of the rear door and the second cover has a generally planar upper surface.

* * * * *